UNITED STATES PATENT OFFICE.

FRANK S. WASHBURN, OF NASHVILLE, TENNESSEE.

PROCESS OF PRODUCING PHOSPHORUS FROM MINERAL PHOSPHATES.

1,047,864.   Specification of Letters Patent.   Patented Dec. 17, 1912.

No Drawing.   Application filed June 17, 1912.   Serial No. 704,171.

*To all whom it may concern:*

Be it known that I, FRANK S. WASHBURN, a citizen of the United States, residing at Nashville, in the county of Davidson and State of Tennessee, have invented certain new and useful Improvements in Processes of Producing Phosphorus from Mineral Phosphates; and I do hereby declare the following to be a full, clear, and exact description of the invention, such as will enable others skilled in the art to which it appertains to make and use the same.

This invention relates to a process of producing high yields of phosphoric acid and phosphates of high degrees of commercial purity from crude, insoluble mineral phosphates, and has for its object to accomplish these results in a simple and expeditious manner.

To these ends the invention consists in the novel steps constituting my process, as will be more fully hereinafter disclosed, and particularly pointed out in the claims.

In order that my precise invention may be the more clearly understood, and that it may be the more easily differentiated from the prior art, the following principles and details of large scale tests are given. That is to say, it is well known that an acid may be displaced from a salt combination by another less volatile acid. For example, hydrochloric and nitric acids have long since been made from their naturally occurring combinations by displacement with the less volatile sulfuric acid, the hydrochloric and nitric acids being boiled off from the mixture and condensed in suitable towers. On these same chemical grounds it should therefore be possible to decompose a natural phosphate by an acid less volatile than phosphoric acid. In such case, the cheapest and most easily obtainable less volatile acid is silicic, found in the form of the anhydrid $SiO_2$, which does not volatilize much under 1800° C. in its pure state, and at even higher temperatures in combination with a strong base. Accordingly, large scale experiments were made to determine if silica would in fact displace phosphoric acid from its combinations at temperatures above the volatilization point of the phosphorus pentoxid, and it was found that if a mineral phosphate, for example the tricalcium phosphate, $Ca_3P_2O_8$, is mixed without carbon with silica as a flux, and subjected to the temperature of an ordinary furnace phosphorus pentoxid, $P_2O_5$, will be evolved in small amounts, but never amounting to more than a few per cent. of the total phosphorus contained in the mixture, even if the heating is sufficient to produce fusion. It was further found that if such a mixture be heated to fusion in an ordinary furnace in the presence of carbon, a larger yield of phosphorus will be had. Some of this phosphorus was found to be in the form of vapor, while other portions were in the form of a mixture of various oxids of phosphorus.

The possible chemical reactions when carbon is and is not used may be represented by the following equations:—

1. 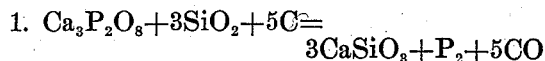
$$Ca_3P_2O_8+3SiO_2+5C=3CaSiO_3+P_2+5CO$$

2. 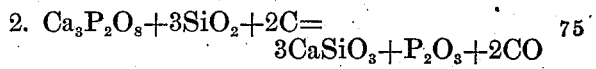
$$Ca_3P_2O_8+3SiO_2+2C=3CaSiO_3+P_2O_3+2CO$$

3. 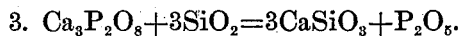
$$Ca_3P_2O_8+3SiO_2=3CaSiO_3+P_2O_5.$$

The first experiments without carbon were carried out on a large scale at a cement works where finely ground mixtures of phosphate rock and various silicious materials were put through a rotary coal-fired cement kiln. Various proportions of phosphate rock and silica in the mix were tried, and the kiln run at different temperatures to determine the influence of the two variables, silica concentration and temperature, on the evolution of phosphorous pentoxid. In order to obtain extremes of temperature finely ground coal was also at times mixed with the material fed to the kiln. The results of these large scale experiments however, confirmed some laboratory work that has been done previously at the Massachusetts Institute of Technology, showing that only a slight evolution of phosphoric acid could be obtained without a reducing agent and by the simple heating of phosphate rock and silica, even at temperatures up to fusion. The amount of phosphorus displaced when carbon was not used in no case was over 30 per cent. of the total amount present; and no carbon being used, the best results were obtained in those cases where the ratio of silica to silica plus lime was about one-half (½) or larger. In those runs, however, that were made with carbon in the mixture, evolutions of phosphorus as high as 60 per cent. of the total quantity in the mixture were attained. These results seemed to prove that a reducing agent in the mixture was necessary to loosen the bonds of the phosphorus, and large scale tests were made with a shaft or cupola furnace, using coke for fuel. The highest temperature produced, however, in such furnace would only partially fuse the charge of phosphate rock, silica and carbon, and the furnace soon became plugged up. It was further observed that even in those portions of the charge where fusion had taken place, the evolution of phosphorus was low. In an attempt to overcome these mechanical difficulties two shaft-type furnaces were built for carrying out the process, but it was found that the temperatures attainable in these furnaces, even under the most skilled management were so little above the fusion temperatures of the charge that there was no possibility of making the process a commercial success, notwithstanding the fact that with a silica content in the slag produced of about 50 per cent., there was obtained evolutions of phosphoric acid at times which seemed promising. But the fuel consumption of the furnace for these promising yields was excessive and I attribute these particular superior dispersions of the phosphoric acid to the large excess of reducing agent then in the furnace. Next an oil-fired reverberatory furnace was tried, because I was assured that it was able to fuse any possible mixture of phosphate rock and silica I might want to try. Accordingly, various mixtures of phosphate rock and silica without carbon, containing up to 1½ parts silica to 1 part lime were fused in this furnace under oxidizing conditions, but in no case was the dispersion of the phosphoric acid found to be more than 5 per cent. of the total amount present. But the addition of small amounts of carbon to the fused mass immediately increased the dispersion to above that figure, and coupled with the extreme limit of temperature attainable in the kiln, there was obtained evolutions as high as 27 to 30 per cent. of the phosphoric acid present, which was still far from commercial success. These results seem to show that neither a reducing agent alone nor a high temperature in ordinary furnaces, without the reducing agent would cause a quick and large dispersion of the phosphoric acid present.

In order to test if a very liquid slag would assist in causing a high yield of phosphorus, a mixture of phosphate rock and silica without carbon was brought to a liquid condition in an arc furnace having carbon electrodes, but only a very slow evolution of phosphorous pentoxid vapor was noted, and even this vapor seemed at least partly due to the carbon of the top electrode in contact with the charge. An arc type of furnace was next employed on a charge consisting of finely divided phosphate rock, silica and carbon with the result that a rapid evolution of 90 per cent. of the contained phosphorus was had in a few minutes.

As to just why a complete fusion without carbon in an ordinary furnace as well as in an arc furnace does not freely liberate the phosphoric acid, according to the well established chemical principles stated in connection with nitric and sulfuric acids above, I am unable to say. And further, just why an addition of carbon greatly promotes the evolution of the phosphorus in the ordinary furnace at the temperature of fushion, but fails to completely liberate it, while in the arc furnace a practically complete evolution of the contained phosphorus is had, I am also unable to say. However, without confining myself to any particular theory, I believe a plausible explanation of the above results partly resides in the probable fact that the silica and slag has to be very fluid in order to permit the phosphorus to escape, even after it is liberated, and that the temperature of an electric furnace is therefore necessary to produce this requisite fluidity. I further believe that a reducing agent such as carbon serves to loosen the chemical bonds of the phosphorus by combining with some of the oxygen in the phosphorus bearing material; that this loosening effect is greatly increased as the temperature rises, and is not at its maximum until all the phosphorus combined oxygen is in a condition capable of being reached by the reducing carbon, which condition is that of a substantially perfect fluidity produced by the temperature of the electric furnace. Whatever the real explanation may be, it is a fact that a commercial process of displacing the phosphorus from phosphates by the agency of silica can only be carried out at the temperature of an electric furnace and above the temperatures attainable in other types of furnaces. It is a further fact that when a mixture in chemical proportions of finely divided tri-calcium phosphate, silica and carbon is subjected to electric furnace temperatures, the phosphorus is driven off rapidly and up to 90 per cent. of the whole. The phosphorus being thus disengaged, sufficient air is fed thereto to produce the pentoxid, $P_2O_5$, and the heat thus liberated is preferably utilized to pre-heat the charge being treated, or in evaporating liquors containing the evolved gases. In cases when it is desired to make phosphoric acid the phosphorous pentoxid may be absorbed by water or it may be suitably absorbed by ammonium or alkali solutions if it is desired to make the corresponding phosphates.

What I claim is:—

1. The process of producing compounds containing oxygen and phosphorus, which consists in mixing natural phosphates with an acid flux and carbon; subjecting the mixture to a temperature above that practical to obtain in fuel fed furnaces in order to bring it to a fluid condition, and thereby driving off substantially all the phosphorus in the form of gases; and mixing said gases with air to form an oxid of phosphorus, substantially as described.

2. The process of producing phosphoric acid, which consists in mixing a finely divided natural phosphate with silica and carbon; rendering the mixture fluid by subjecting the same to a temperature above that practical to obtain in furnaces fed by coal, coke or gas, thereby driving off substantially all the phosphorus contained in the mixture in the form of gases; and feeding air to said gases to produce phosphorous pentoxid, $P_2O_5$, substantially as described.

3. The process of producing phosphoric acid, which consists in mixing a finely divided natural phosphate with silica and carbon; rendering the mixture fluid by subjecting the same to a temperature above that practical to obtain in furnaces fed by coal, coke or gas, thereby driving off substantially all the phosphorus contained in the mixture in the form of gases; withdrawing the latter from said furnace and feeding air to said gases to produce phosphorous pentoxid, $P_2O_5$; and finally subjecting said pentoxid to the action of water to produce phosphoric acid while utilizing the heat thus produced to pre-heat the mixture about to be fed into the furnace, substantially as described.

In testimony whereof, I affix my signature, in presence of two witnesses.

FRANK S. WASHBURN.

Witnesses:
H. A. BLACK,
W. D. KIRKPATRICK.